United States Patent
Ma et al.

(10) Patent No.: US 7,092,567 B2
(45) Date of Patent: Aug. 15, 2006

(54) POST-PROCESSING SYSTEM AND METHOD FOR CORRECTING MACHINE RECOGNIZED TEXT

(75) Inventors: Yue Ma, West Windsor, NJ (US); Jinhong Katherine Guo, West Windsor, NJ (US); Mu Li, Beijing (CN); Yu-kun Tong, Shenyang (CN); Tian-shun Yao, Shenyang (CN); Jing-bo Zhu, Sheyang (CN)

(73) Assignee: Matsushita Electric Industrial Co., Ltd., Osaka (JP)

( * ) Notice: Subject to any disclaimer, the term of this patent is extended or adjusted under 35 U.S.C. 154(b) by 815 days.

(21) Appl. No.: 10/288,645

(22) Filed: Nov. 4, 2002

(65) Prior Publication Data

US 2004/0086179 A1 May 6, 2004

(51) Int. Cl.
*G06K 9/34* (2006.01)
*G06K 9/72* (2006.01)
*G06K 9/03* (2006.01)
*G06F 17/27* (2006.01)

(52) U.S. Cl. .............. 382/177; 382/229; 382/309; 704/9

(58) Field of Classification Search ............... 382/177, 382/178, 229, 230, 309, 310; 704/2, 4, 9
See application file for complete search history.

(56) References Cited

U.S. PATENT DOCUMENTS

| | | | |
|---|---|---|---|
| 4,903,206 A | 2/1990 | Itoh et al. | 715/533 |
| 5,048,113 A | 9/1991 | Yamagata et al. | 382/310 |
| 5,377,281 A | 12/1994 | Ballard et al. | 382/229 |
| 5,418,864 A | 5/1995 | Murdock et al. | 382/309 |
| 5,455,875 A | 10/1995 | Chevion et al. | 382/311 |
| 5,610,812 A | 3/1997 | Schabes et al. | |
| 5,615,378 A | 3/1997 | Nishino et al. | 704/4 |
| 5,703,972 A | 12/1997 | Lopresti et al. | 382/310 |
| 5,748,807 A | 5/1998 | Lopresti et al. | 382/310 |
| 5,802,504 A | 9/1998 | Suda et al. | 706/11 |
| 5,805,747 A | 9/1998 | Bradford | 382/310 |

(Continued)

FOREIGN PATENT DOCUMENTS

WO WO 01/29697 A1 4/2001

OTHER PUBLICATIONS

R.M.K. Sinha et al., Hybrid Contextual Text Recognition with String Matching, IEEE Transaction on Pattern Analysis and Machine Intelligence, Sep. 1993, pp. 915-925, vol. 15, No. 9, New York, N.Y., U.S..

(Continued)

*Primary Examiner*—Duy M. Dang
(74) *Attorney, Agent, or Firm*—RatnerPrestia (57) ABSTRACT

A method of post-processing character data from an optical character recognition (OCR) engine and apparatus to perform the method. This exemplary method includes segmenting the character data into a set of initial words. The set of initial words is word level processed to determine at least one candidate word corresponding to each initial word. The set of initial words is segmented into a set of sentences. Each sentence in the set of sentences includes a plurality of initial words and candidate words corresponding to the initial words. A sentence is selected from the set of sentences. The selected sentence is word disambiguity processed to determine a plurality of final words. A final word is selected from the at least one candidate word corresponding to a matching initial word. The plurality of final words is then assembled as post-processed OCR data.

21 Claims, 6 Drawing Sheets

U.S. PATENT DOCUMENTS

| | | | |
|---|---|---|---|
| 5,832,474 A | * | 11/1998 | Lopresti et al. ............. 382/309 |
| 5,933,531 A | | 8/1999 | Lorie ......................... 386/229 |
| 6,014,460 A | | 1/2000 | Fukushima et al. ......... 382/177 |
| 6,047,093 A | | 4/2000 | Lopresti et al. ............. 382/310 |
| 6,374,210 B1 | | 4/2002 | Chu |
| 6,721,697 B1 | * | 4/2004 | Duan et al. .................... 704/9 |

OTHER PUBLICATIONS

Karen Kukich, Techniques for Automatically Correcting Words In Text, ACM Computing Surveys, Dec. 1, 1992, pp. 377-439, vol. 24, No. 4, New York, NY, U.S..

\* cited by examiner

POST-PROCESSING SYSTEM AND METHOD FOR CORRECTING MACHINE RECOGNIZED TEXT

FIELD OF THE INVENTION

This invention is in the field of optical character recognition (OCR), and specifically relates to the post-processing of data from an OCR engine.

BACKGROUND OF THE INVENTION

Existing OCR engines may suffer from low accuracy rates. For many applications where OCR may be highly desirable, the error rates of commonly available OCR engines may be unacceptably high, even for relatively simple documents. Additionally, when dealing with documents having complex layouts and contents, the best presently available OCR engines may still have a relatively low recognition rate. Therefore, an improved method of post processing OCR output data is desirable. Post-processing systems may be used to attempt to correct these errors improving the quality of the text.

Frequent OCR errors include too many erroneous characters within a word and word segmentation errors, but other errors, such as systematic mis-recognition of particular strings may exist as well.

One common post-processing method involves comparing the OCR data to a dictionary. The dictionary may contain commonly occurring character strings as terms in addition to words, depending on the application. Various methods may be used to determine appropriate corrections for OCR data not matching terms in the dictionary, but often more than one equivalent correction may exist for a given character string. Dictionary methods may also have particular difficulties dealing with numeric data, acronyms, and proper names.

Many existing post-processing systems assume machine recognized text to have a high recognition rate. For example, in most systems, a numeric string recognizer may be used such that numeric strings are simply bypassed without any further processing. However, in practice, not all numeric characters will be recognized correctly (e.g. "3000" may be recognized as "300o"). In such cases, it is desirable for a post-processing scheme needs to correctly recognize a string, such as "300o" as numeric and provide correction.

Similarly, acronyms in inaccurate OCR data may not be properly recognized as such by many post-processing systems. Further, errors occurring in a proper noun may be difficult to detect. In many post processing systems, only the morphology of acronyms and proper nouns is used to detect these character strings. For example, an acronym may be defined as "a string of three to six uppercase letters, bounded by non-uppercase letters." This definition is often useful for acronyms, but it is generally too limited to detect proper nouns. A surname or given name, for example, frequently does not exist in a lexicon, but it is desirable for these names to be recognized as proper nouns.

Stochastic n-gram models have been proposed as powerful and flexible methods to parse the text. In "Adaptive Post-Processing of OCR Text via Knowledge Acquisition," ACM 1991 Computer Science Conference, Liu et al. used a tri-gram method to detect possible error characters in a word. If OCR output data has a high accuracy level, this method is reasonably efficient, but the method is less efficient for less accurate data sets.

SUMMARY OF THE INVENTION

One embodiment of the present invention is a post-processor for character data of an optical character recognition (OCR) engine including a word segmentation engine, a word level processor, a sentence segmentation engine, and a word disambiguity processor. The word segmentation engine is coupled to the OCR engine and segments the character data into a plurality of initial words. The word level processor is coupled to the word segmentation engine to process the plurality of initial words and determines a set of candidate words corresponding to each initial word. The sentence segmentation engine is coupled to the word level processor and segments the plurality of initial words into at least one sentence. The word disambiguity processor is coupled to the sentence segmentation engine. The word disambiguity processor processes each sentence separately to determine the final words from each set of candidate words.

An additional embodiment of the present invention is a method of post-processing character data from an optical character recognition (OCR) engine. This exemplary method includes segmenting the character data into a set of initial words. The set of initial words is processed at the word level to determine at least one candidate word corresponding to each initial word. The set of initial words is segmented into a set of sentences. Each sentence in the set of sentences includes a plurality of initial words and candidate words corresponding to the initial words. A sentence is selected from the set of sentences. The selected sentence is word disambiguity processed to determine a plurality of final words. A final word is selected from the at least one candidate word corresponding to a matching initial word. The plurality of final words is then assembled as post-processed OCR data.

BRIEF DESCRIPTION OF THE DRAWINGS

The invention is best understood from the following detailed description when read in connection with the accompanying drawing. Included in the drawing are the following figures.

DETAILED DESCRIPTION

The present invention involves a method of post processing machine-recognized text from an OCR engine, particularly an OCR engine with a low recognition rate, and an apparatus for performing this method. An exemplary embodiment of the method may include linguistic models, such as chunk and n-gram methods.

Figure 1:
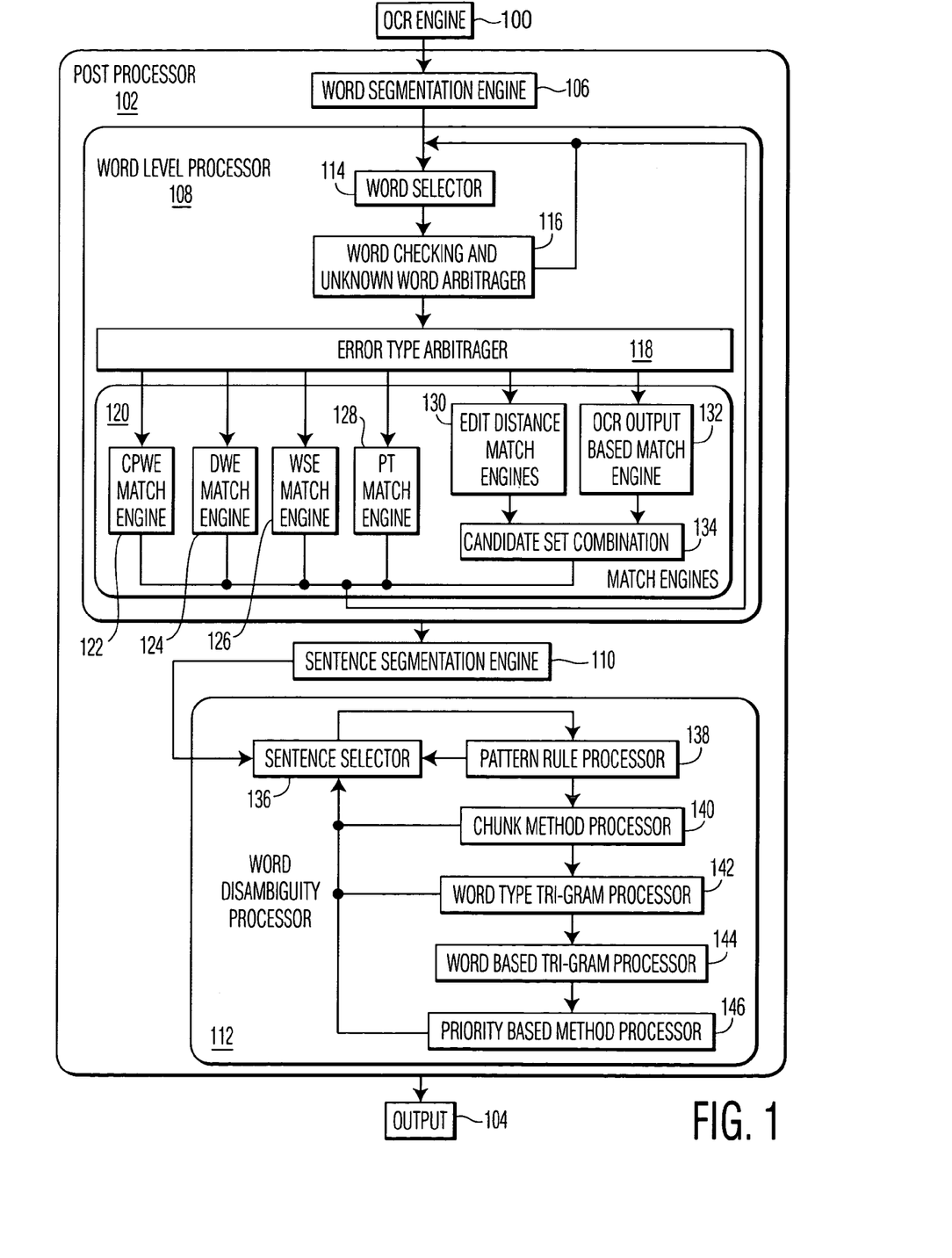
FIG. 1 is a block diagram of an exemplary post-processor for OCR data.

FIG. 1 illustrates a block diagram of an exemplary apparatus for post-processing of OCR data to improve to the accuracy of the resulting machine recognized text. In FIG. 1, data from OCR engine 100 is processed by post-processor 102 and then provided to output device 104. The output device may include a digital storage device, computer system, or printer. Post-processor 102 includes several processing modules: word segmentation engine 106, word level processor 108, sentence segmentation engine 110, and word disambiguity processor 112. These processing modules may be implemented as special purpose circuitry or they may be carried out within a general purpose computer system instructed to perform these functions by means of a computer-readable medium. Such computer-readable media include; integrated circuits, magnetic and optical storage media, as well as audio-frequency, radio frequency, and optical carrier waves.

Figure 2:
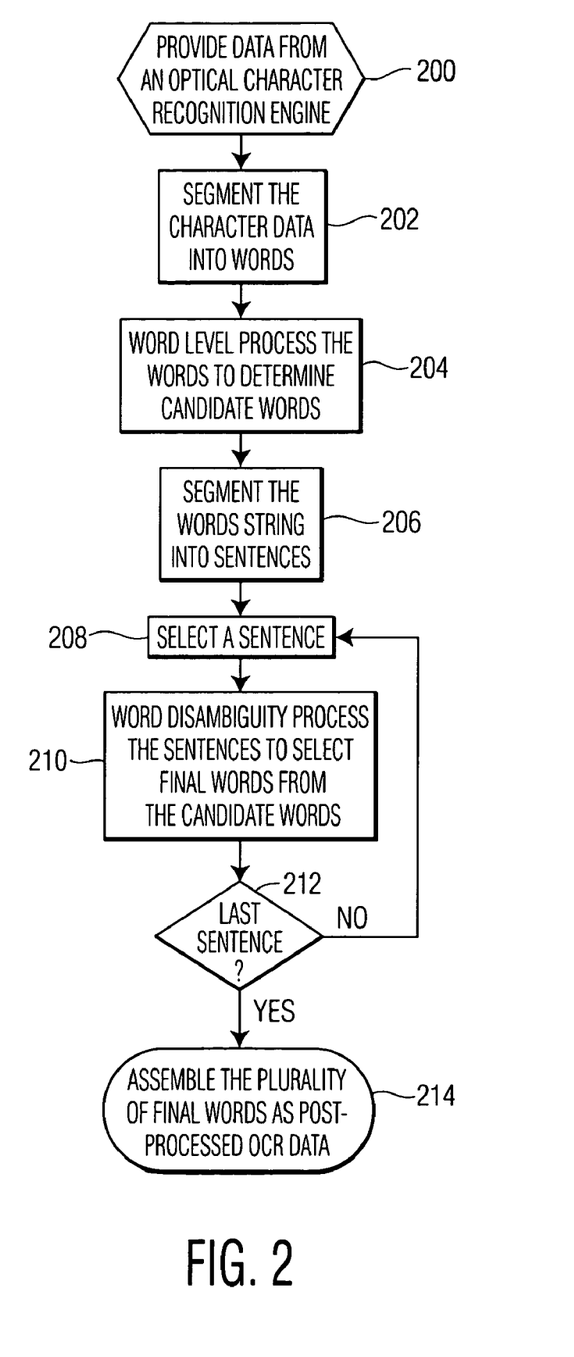
FIG. 2 is a high level flowchart illustrating an exemplary method of post-processing OCR data.

FIG. 2 illustrates a module level flowchart of an exemplary method of post-processing OCR output data using exemplary post-processor 102 of FIG. 1. The exemplary method of FIG. 2 begins with character data provided by OCR engine 100, step 200. The output data of OCR engine 100 may desirably be a multi-dimension string of character data. Such output data has a number of candidate characters for each processed character. For example, a ground character, labeled "C," may have three options C1, C2 and C3 determined by the OCR engine as candidate characters for C. These candidate characters are desirably sorted by their weights. The weight given to a candidate character represents the empirical likelihood of C being recognized as Ci(i=1, 2, 3). The first dimension character string is made of all C1s while the second dimension character string is made of all C2s, etc.

The OCR character data is processed by word segmentation engine to segment the data in a set of "word strings," step 202. The character string is segmented into word strings by delimiters, such as "space", "(", ")", "<", ">", and characters which have a smaller ASCII code than "space", based on the first dimension character string. Punctuation symbols may also be treated as delimiters when they are at the end of a word. Table 1 is an example of a word segmented character string.

transformation cost of the candidate word. This transformation cost may desirably includes a number of criteria describing the likelihood that a particular candidate word is the correct text of the original document based on the OCR data. Among possible transformation cost elements are: an edit distance calculation (edist), representing the amount of transformation necessary to convert the initial word from the OCR data string into the candidate word; the number of characters that are the same in both the initial word and the candidate word (samec); and the frequency of the candidate word (fr). Often the edist alone will be enough to rank the various candidate word corresponding to an initial word. Samec may provide criteria to rank candidate words having the same edist. The fr of a candidate word represents how often a word generally appears in the language and may be used to rank candidate words that both seem to be equally likely transformations of the initial word (same edist and samec). Fr may be determined empirically from a corpus of words. This corpus may desirably be a general corpus representing word frequency in the language. If available, specific information regarding words that may be unusually common, or uncommon, in the original document may be used to augment the corpus information. General English corpora, which may be desirable to use, include British National Corpus (BNC-world) and TREEBANK.

The number of candidate words in each set may range from one to a maximum predetermined number, with the number in a particular set depending on the correction method employ by word level processor 108. Alternatively, each set of candidate words may include every candidate word with less than a predetermined transformation cost. In the exemplary embodiments herein described the maximum number of candidate words is three and an edit distance of 30 is used as a maximum transformation cost, which may further limit the number of candidate word corresponding to an initial word.

Some exemplary word level processing methods are described in detail below with regard to FIGS. 3, 4, and 5. Exemplary word level processor 108 shown in FIG. 1 may be used to accomplish these exemplary methods.

TABLE 1

| Gnd | This | is | a | Sample | zone | . | It | is | a | very | small | one | . |
|---|---|---|---|---|---|---|---|---|---|---|---|---|---|
| C1s | Th1S | 1S | a | SomP1e | Zone | . | Lt | 1S | o | VerY | Sma11 | one | . |
| C2s | 7bis | is | o | sanpla | z0ma | , | Ib | is | a | vaty | snoll | 0ma | , |
| C3s | Yk15 | 15 | e | 5eMRIo | 2aNo | ' | ik | 15 | e | nofq | $NeII | aro | ' |

The above table shows a sample zone of characters that have been divided into words by delimiters. Row Gnd is the ground truth. C1s is the first candidate string, C2s is the second and C3s is the third. For this specific example, there are two sentences.

The resulting sets of candidate words determined by word level processor 108 are then segmented into sentences, step 206, by sentence segmenting engine 110. A word string may desirably be segmented into sentences by punctuation symbols within the OCR character string, and possibly by the

TABLE 2

| Gnd | This | is | a | Sample | zone | . | It | is | a | very | small | one | . |
|---|---|---|---|---|---|---|---|---|---|---|---|---|---|
| C1s | Th1S | 1S | a | SomPle | Zone | . | It | 1S | o | VerY | Smal l | one | . |
| C2s | 7bis | is | o | sanpla | z0ma | , | Ib | is | a | vaty | snoll | 0ma | , |
| C3s | Yk15 | 15 | e | 5eMRIo | 2aNo | ' | ik | 15 | e | uofq | $NeII | aro | ' |

The segmented word strings are processed by word level processor 108 to create a set of candidate words for each of the initial words in the word string, step 204. The candidate words in each set of candidate words are ordered by the number of words. For example, English sentences normally have 4 to 15 words on average. Therefore, English language word strings of less than 4 words between punctuation marks may represent a clause and may be associated with either the sentence string before or after it. Similarly, English language words strings exceeding 15 words may be truncated and treated as two or more sentences. A word string including only the first candidate word of each set is desirably used to determine the sentence segmentation. In the exemplary text of Table 1 there are two sentences, which are marked by a punctuation mark (".", ",", or """) at the end of each sentence. Special marks may be added to the beginning and the end of each sentence, e.g. "!@#senhead#@!" to mark the beginning of a sentence and "!@#sentail#@!" to mark the end of a sentence.

The sentences segmented in step 206 are then provided to word disambiguity processor 112 where a number of sentence level, linguistic, processing method may be used to further improve the accuracy of the post-processed OCR data provided to the output. These word disambiguity methods are desirably used to choose the best word from the set of candidate words corresponding to each initial word as the output data of the post processing system. The segmented sentences are selected one at a time, step 208, by sentence selector 136.

After the OCR data has been processed at the word level in step 204, candidate word sets are desirably formed for each initial word and sorted by transformation cost (e.g. edist, samec and fr). The candidate word sets of the selected sentence are provided to the various sentence level processing sub-modules of word disambiguity processor 112 for word disambiguity processing, step 210. The various sentence level processing sub-modules each perform a specific linguistic method on the candidate word sets of the sentence to select a final word for from among each candidate word set for the post-processed OCR output data. Exemplary linguistic methods which may desirably be used by a sentence level processing sub-module of word disambiguity processor 112 include: chunk-based candidate choosing methods; word-type based tri-gram candidate choosing methods; word based tri-gram candidate choosing methods; and pattern rules methods. These exemplary linguistic methods are described in detail below with regard to FIG. 6.

In some cases, the candidate word set corresponding to a particular initial word contains only one candidate word after word processing. Such "well recognized" words are marked as final words and are desirably not processed further. Each linguistic method may determine additional final words. Once a final word matching an initial word has been determined, it is desirably marked to bypass all additional sentence level processing sub-modules. Therefore, the various linguistic methods may desirably be used in a specific order to improve efficiency of the word disambiguity processor.

Sentences including only final words may desirably be marked as complete and all remaining sentence level processing sub-modules skipped. Word disambiguity processing is then finished for the selected sentence and sentence selector 136 is queried whether the last sentence has been processed, step 212. If the final sentence level processing sub-module fails to determine a final word matching an initial word, the first candidate word is selected as the final word before querying sentence selector 136.

If sentence selector 136 still has any sentences which have not been processed by word disambiguity processor 112, a new sentence is selected, step 208, and it is processed by the word disambiguity processor, step 210. Once all of the sentences have been processed by word disambiguity processor 112, the plurality of final words is assembled and provided to output device 104 as the post-processed OCR data.

Figure 3:
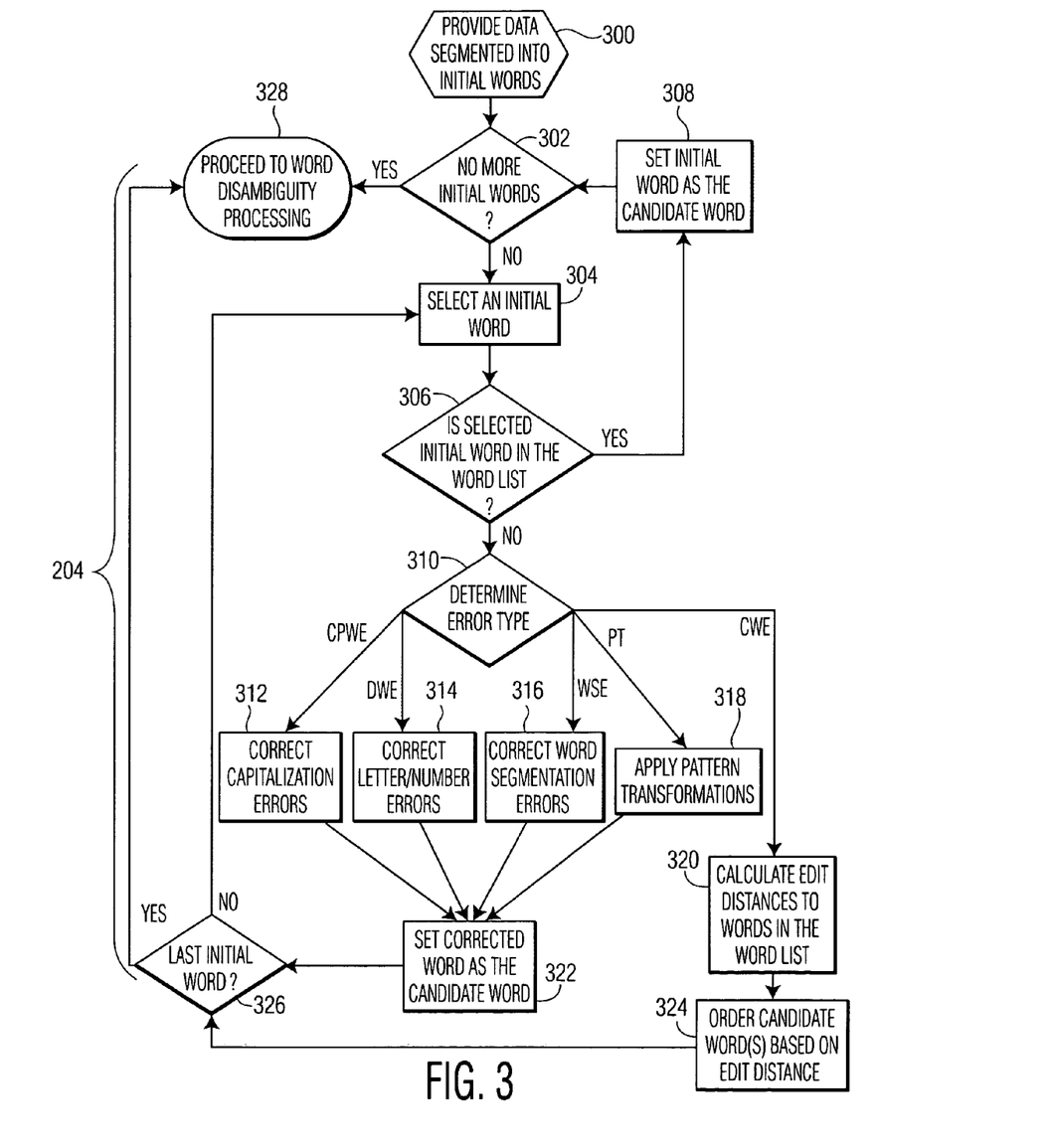
FIG. 3 is a detailed flowchart illustrating an exemplary word-level processing method for post-processing OCR data.

FIG. 3 is a detailed flowchart of an exemplary word level processing method using word level processor 108, shown in FIG. 1. This exemplary method may be used as part of the exemplary post processing method described above with regard to FIG. 2 (step 204).

The exemplary method begins with the first dimension character data segmented into initial words, step 300. Additional dimensions of the OCR character data may be used to calculate transformation costs in step 320, but are desirably not used during other steps of this exemplary method. Word selector 114 is queried to determine if there are any initial words awaiting word level processing, step 302. If there are remaining unprocessed initial words word selector 114 selects one of these initial words, step 304.

The first dimension of the selected initial word is compared to pregenerated word dictionary, step 306, by word checking and unknown word arbitrator 116. This word dictionary includes a word list that may desirably be collected from public domain dictionaries, such as iSpell and Wordnet for an English language word dictionary, and may be augmented to include additional words anticipated to be found in original document(s) being converted to machine readable text. Alternatively, the word dictionary may be grown by adding to the dictionary final words not previously in the dictionary after post-processing.

Unlike many common public domain dictionaries, which use grammar rules to transform a common word into other forms, such as plural or past tense, the pregenerated word dictionary desirably includes the basic words and their various forms. To have a better coverage of commonly used words, more words may be retrieved from other sources, such as corpora (e.g. BNC-world and TREEBANK for English language word dictionaries). The frequency of each word in the corpora may also be calculated and stored in the word dictionary. Additional words with higher frequency may be added to the basic dictionary. The word dictionary may be loaded in a compressed format to reduce memory usage. Desirably, the word dictionary is made up of two parts: a file header and a data body.

An exemplary word dictionary header may contain several fields such as a number that identifies the exemplary word dictionary format, the header size, the offset and the size of the data. An exemplary header size of 1024 is contemplated. Remaining space in the header may be reserved for future extension.

An exemplary data body may include of word entries. Each entry may be headed by a word start symbol such as '#', followed by the entry data, and ended with a word end symbol such as '\n'. Other information, such as the part of speech of the word may be included as well. It is observed that many adjacent words share the same stem in a dictionary, i.e., they share the same leading characters. For example, the word "information" and its precedent, "inform", share 6 characters. A special field in the entry data may be used to express this information. This may allow the entire data size of the dictionary to be reduced. During word level processing, the word list dictionary may be loaded into a hash table in order to reduce searching time.

If the selected initial word matches a word in the word list dictionary, then the initial word is determined to be a "recognized word." The set of candidate words for the recognized word is formed, step 308, and the process returns to query word selector 114 whether any unprocessed initial words remain, step 302. The set of candidate words for a recognized word has only one member, the recognized initial word. A part of speech (POS) may be included with each candidate word for use by word disambiguity processor 112.

An "unknown word" is an initial word that is not found in the dictionary and that the match engines of match engine level 120 are unlikely to be able to handle. It may be desirable to treat an "unknown word" in the same manner as a recognized word. Context may be used to determine if an initial word is unknown. One criterion is whether the initial word contains any of the characters "- _ . /", such initial word may be determined to be unknown word. Another unknown word criterion is whether the initial word contains fewer than 2 "word characters" or more than 2 "un-word characters." "a–z", "A–Z" and "*$1234567890,'@!-" are word characters, other characters are un-word characters.

If the selected initial word does not match a word in the word dictionary, then it is provided to error type arbitrator 118 to identify an error type for the selected initial word, step 310. The determined error type is used to select the corresponding match engine of match engine level 120 for processing of the selected initial word.

The exemplary embodiments shown in FIGS. 1 and 3 illustrate five different exemplary error types, capital word error (CPWE), digital word error (DWE), word segmentation error (WSE), pattern transforms (PT), and common word errors (CWE). Each of these exemplary error types is associated with a different exemplary process step in FIG. 3.

It may be difficult for the OCR engine to distinguish Latin characters such as "c f i l j k o p s u v w x y z" from their corresponding upper case characters "C F I L J K O P S U V W X Y Z" (similar difficulties may exist for other alphabets as well). This difficulty may lead to a CPWE. A typical example of capital error may be the incorrect recognition of "pANAsoNic" instead of "PANASONIC" or "errOr" instead of "error." To detect this error type, error type arbitrator 118 checks all the characters of a word for these "difficult case" characters. If there are a number of upper case characters and all the lower case characters are the above characters, or if there are a number of lower case characters and all the upper case characters are the above characters, then the error type is classified as capital word error. Initial words determined to have a CPWE are processed by CPWE match engine 122 to correct the capitalization error, step 312, by changing the case of all the difficult case characters in the initial word to match the case of the remaining characters.

There are many numeric expressions, which are not in the dictionary, but may occur in a document that may desirably be converted to machine recognizable text, such as 1998, $25,000, 2001-12-26 etc. Commonly a digit may be mis-recognized as a letter by an OCR engine, for example, "2" as "z," "5" as "s," and "0" as "O." This may lead to a DWE. To detect this error type, error type arbitrator 118 calculates the total count of digits within the selected initial word and checks if all the letters in the word are likely transforms for digits, or all the digits are likely transforms for letters, of the specific OCR engine. Initial words determined to have a DWE are processed by DWE match engine 124 to correct the letter/number error, step 312. If the majority of the characters in a word determined to have a DWE type are digits and all the letters in the word are likely transforms for digits, DWE match engine 124 transforms the letters of the initial word to digits. If the majority of the characters in the word are letters and all the digits in the word are likely transforms for letters, DWE match engine 124 transforms the digits of the initial word to letters. It is noted that it may be desirable to only apply this error type to initial words for which only a small portion of the characters are effected by the transformation of the characters.

An OCR engine may over segment a word, leading a WSE. For example, "albatross" may be recognized as "alb atross." To detect this error type, error type arbitrator 118 checks the succeeding initial word in the OCR data set. If the succeeding initial word is not a recognized word, the selected initial word and the succeeding initial word are concatenated with the intervening delimiter removed. If the concatenation is a recognized word, then the error type of the selected initial word is determined to be a WSE. Initial words determined to have a WSE are processed by WSE match engine 126 to correct the word segmentation error, step 316. WSE match engine 126 corrects the initial word to the concatenated word and removes the succeeding initial word from the initial word list stored in word selector 114.

An OCR engine may systematically make the same mistake with a specific word, resulting in a PT error type. For example, a certain OCR engine may always recognize the word "the" as "tk." To detect this error type the selected initial word is compared to a list of known patterns for the OCR engine which generated the original character data by error type arbitrator 118. Initial words determined to have a PT error type are processed by PT match engine 128 to apply a corrective pattern transformation, step 318. The corrective pattern transformation reverses the systematic mistake of the OCR engine.

In the exemplary word level processing method of FIG. 3, correction of CPWE, DWE, WSE, and PT error types in steps 312, 314, 316, and 318, respectively, result in a single corrected word which may be set as the only candidate word in the set of candidate words corresponding to the selected initial word, step 322, by word level processor 108.

Selected initial words that error type arbitrator 118 does not determine to have a CPWE, DWE, WSE, and PT error type are determined to have a CWE error type. These initial words may be processed by edit distance match engine 130 and OCR output based match engine 132. Both of these match engines may be used to generate the set of candidate words to be associated with the selected initial word and information such as transformation cost (e.g. edist, samec, and fr), step 320. An exemplary method of operation for edit distance match engine 130 is illustrated in FIG. 4 and an exemplary method of operation for OCR output based match engine 132 is illustrated in FIG. 5. These exemplary methods are described in detail below.

The candidate words determined by edit distance match engine 130 and OCR output based match engine 132 are ordered by candidate word set combination buffer 134, step 322, according to the transformation costs calculated by the match engines in step 320. The set of candidate words may include every candidate word found by the match engines in step 320 or may be truncated to contain a predetermined number of candidate words. If no words from in the dictionary word list are determined by edit distance match engine 130 and OCR output based match engine 132 to be possible candidate words corresponding to a selected initial word then the selected initial word is set as the candidate word.

Once the ordered set of candidate words corresponding to the selected initial word has been formed, either in step 322 or step 324, word selector 114 is queried to determine if there are any initial words awaiting word level processing, step 326. If there are remaining unprocessed initial words, word selector 114 selects one of these initial words, returning to step 304. If the most recently processed initial word was the last initial word of the OCR output data, then the word level processing of the OCR data is completed and post-processor 102 proceeds to word disambiguity processing of the sets of candidate words.

Figure 4:
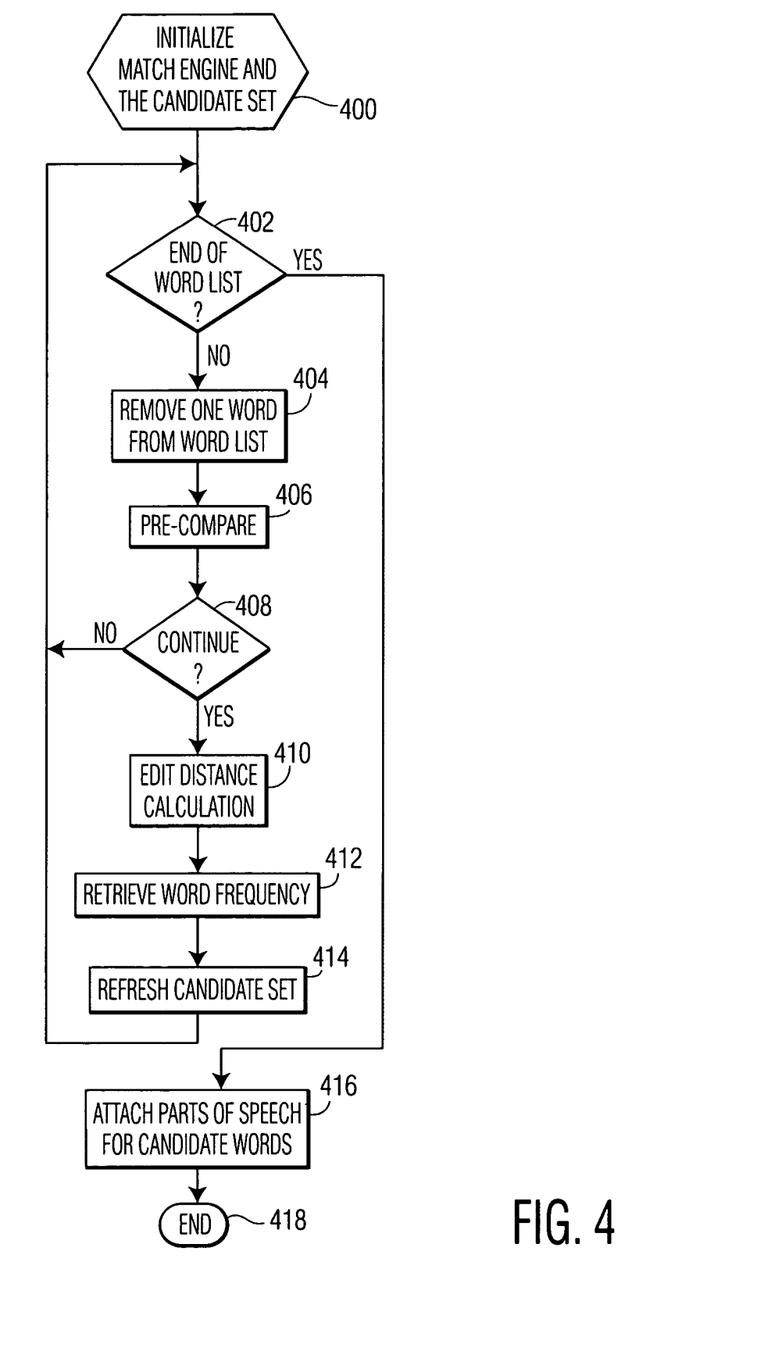
FIG. 4 is a detailed flowchart illustrating an exemplary method of determining candidate words.

FIG. 4 illustrates an exemplary method of operation of an edit distance match engine, such as exemplary edit distance match engine 130. This match engine may be used to calculate the edit distance between every word of the word list dictionary and the initial word, then save the words that have the smaller costs as the candidate word set corresponding to the initial word. The candidate word set may desirably have a maximum number of words, and/or may include all dictionary words having an edit distance less than a predetermined value. In the present exemplary embodiment the candidate word set has a maximum of three words and only words having an edit distance of 30 or less are included.

The edit distance (edist) is the cost of changing one word into another. For example, if "this" is changed into "thus", one step of character transform operation is needed: "i" to "u." If the cost of this character transform is defined as cost1, then the cost of changing "this" into "thus" is cost1. If three steps are needed to change one word into another and character transform costs are defined as cost1, cost2 and cost3, then the cost of changing one word to another one is cost1+cost2+cost3. These costs may be represented in the confusion matrix. Examples of basic transform operations include: insertion (e.g. "rn" changes to "rin"); deletion (e.g. "rin" changes to "rn"); substitution (e.g. "this" changes to "thus"); and merge e.g. ("rn" changes to "m")

Using these four exemplary basic transform operations, one word (word1) may be transformed into another one (word2) with a group of operations. The lowest operation cost necessary to perform the transformation is defined as the edit distance of word1 and word2. For example, denote $U[0 \ldots m]$ and $V[0 \ldots n]$ as the two word strings, word1 and word2. $U[0 \ldots m]$(word1) is the input mis-recognized word and $V[0 \ldots n]$(word2) is the possible match in the dictionary word list. $U[x]$ and $V[x]$ denote the characters which have the suffix of x. subCost(c1, c2) represents the cost of substituting of c1 for c2 and mergecost(c, c1, c2) represents the cost of merging c1 and c2 into one character c (c, c1 and c2 may be represented by the ASCII codes of characters). A deletion operation may be modeled as subCost(NULL, c1) and an insertion operation may be modeled as subCost(c1, NULL).

A confusion matrix, providing substitution and merge costs, may be obtained from a comparison of the output of the OCR engine and a corresponding ground truth text. This method compares data determined by the OCR engine and the corresponding ground truth words to define costs for the possible substitution and merge operation transforms. For example, if the ground truth is "return" and the corresponding word from the OCR engine is "retUm"; the operations "rn" to "m" and "u" to "U" may be stored. All the sample test results are processed, and the resulting operations may be separated into levels based on their frequency of occurrence The operation may then be given costs according to their level, i.e. the more often an operation occurs in the test set, the smaller its cost is. For those transformations that cannot be determined automatically, costs may be assigned manually. Additionally, an edit distance match engine may continue to update the operation costs by monitoring the frequency of occurrence of transformations during normal operation of the word level processor. In the present exemplary embodiment, these costs are set to integer values ranging from 0 to 10 for a substitution and 0 to 20 for a merge. Substitution costs are initialized to 10 and merge costs are initialized to 20 before training. The values are then adjusted down according to the frequency of the operation.

The array edist($U[0 \ldots m]$, $V[0 \ldots n]$) represents for the edit distance between these two strings, $U[0 \ldots m]$(word1) and $V[0 \ldots n]$(word2). The edit distance between $U[0 \ldots m]$ and $V[0 \ldots n]$ can be expressed recursively as shown in Equation 1.

$$\text{edist}(U[x]V[y]) = \min\{\text{edist}(U[x-1], V[y-1]) + \text{subCost}(U[x], V[y]); \text{edist}(U[x-1], V) + \text{subCost}(U[x], V[y]); y \text{ edist}(U[x], V[n-1]) + \text{subCost}(U[x], V[y]); y \text{ edist}(U[x-1], V[n-2]) + \text{mergeCost}(U[x], V[y-1], V[y])\} y$$

Equation 1

The initial value is L*10, the edit distance between NULL and a string while L is the length of the string. A dynamic programming approach may be implemented to speed up the procedure of finding the minimum cost. edist[0][0], the edit distance between two NULL sub-strings, $U[0 \ldots -1]$ and $V[0 \ldots -1]$ is assumed to be 0. An exemplary edit distance calculation is illustrated below using Tables 3–7.

Ground word "make" ($V[0 \ldots 3]$) is recognized as "mcke" ($U[0 \ldots 3]$) by the OCR. Assume that subCost('c', 'a')=8 and all the other substitution costs are 10, all merge costs are 20. To initialize, fill the table's first row and first column as:

TABLE 2

| E (U[3]) | 40 | | | | |
|---|---|---|---|---|---|
| k (U[2]) | 30 | | | | |
| c (U[1]) | 20 | | | | |
| m (U[0]) | 10 | | | | |
| NULL | Edist(−1,1)=0 | 10 | 20 | 30 | 40 |
| | NULL | m (V[0]) | a (V[1]) | k (V[2]) | e (V[3]) |

Now, the costs of the substrings is calculated. As described earlier, edist[x][y] is the edit distance between $U[0 \ldots x-1]$ and $V[0 \ldots y-1]$. To calculate edist[x][y], x is first set to 1 and y increments from 1 to 4.

The table is updated as:

TABLE 3

| e (U[3]) | 40 | | | | |
|---|---|---|---|---|---|
| k (U[2]) | 30 | | | | |
| c (U[1]) | 20 | | | | |
| m (U[0]) | 10 | 0 | 10 | 20 | 30 |
| NULL | 0 | 10 | 20 | 30 | 40 |
| | NULL | m (V[0]) | a (V[1]) | k (V[2]) | e (V[3]) |

Now x=1 and finish the third line.

TABLE 4

| e (U[3]) | 40 | | | | |
|---|---|---|---|---|---|
| k (U[2]) | 30 | 20 | 18 | 8 | 18 |
| c (U[1]) | 20 | 10 | 8 | 18 | 28 |
| m (U[0]) | 10 | 0 | 10 | 20 | 30 |
| NULL | 0 | 10 | 20 | 30 | 40 |
| | NULL | m (V[0]) | a (V[1]) | k (V[2]) | e (V[3]) |

Now x=2 and finish the fourth line.

TABLE 5

| e (U[3]) | 40 | | | | |
|---|---|---|---|---|---|
| k (U[2]) | 30 | 20 | 18 | 8 | 18 |
| c (U[1]) | 20 | 10 | 8 | 18 | 28 |
| m (U[0]) | 10 | 0 | 10 | 20 | 30 |
| NULL | 0 | 10 | 20 | 30 | 40 |
| | NULL | m (V[0]) | a (V[1]) | k (V[2]) | e (V[3]) |

And finally:

TABLE 7

| e (U[3]) | 40 | 30 | 28 | 18 | 8 |
| k (U[2]) | 30 | 20 | 18 | 8 | 18 |
| c (U[1]) | 20 | 10 | 8 | 18 | 28 |
| m (U[0]) | 10 | 0 | 10 | 20 | 30 |
| NULL | 0 | 10 | 20 | 30 | 40 |
| | NULL | m (V[0]) | a (V[1]) | k (V[2]) | e (V[3]) |

Edist("mcke", "make")=edist[3][3]=8.

The exemplary edit distance match engine operation of FIG. 4 begins by initializing the match engine and the candidate word set corresponding to the selected initial word, step 400. Only the first dimension of the initial word is used in this exemplary operation.

Edit distance match engine 130 is queried to determine if the end of the dictionary word list has been reached, step 402. If words remain in the dictionary list, then the first remaining word is selected for comparison to the initial word, step 404. The selected dictionary word and the initial word are pre-compared, step 406. The pre-comparing step is designed to speed up the process. In present exemplary embodiment, the mis-recognized word and the corresponding candidate words are determined to have an edit distance less than 30. Thus, it is desirable not to perform a complete edit distance calculation for any words with a length difference or a character difference more than three. If a dictionary word is rejected by this pre-comparison, the operation returns to query edit distance match engine 130 if any other dictionary words remain to be compared, step 408.

For each word in the word list that is not rejected by the pre-comparison step, the edit distance (edist) between the selected dictionary word and the mis-recognized initial word is calculated, step 410. The number of same characters in the two words (samec) may also be determined in this step. The word frequency of the compared dictionary word (fr) is also retrieved from the word dictionary, step 412. word1(edist, samec, fr) and word2(edist, samec, fr) may be used to denote the total transformation costs of two different possible candidate words.

The candidate word set corresponding to the initial word is then refreshed, step 414. The edist for the selected word is compared to the edist of candidate words already in the candidate word set. The relative samec's and fr's may also be considered while comparing words, particularly for words with the same edist. The selected word is placed among the set of candidate words in ascending order of edist. Those words with the same edist are ordered in descending order of samec, and any of those with identical samec's in descending order of fr. If the total transformation cost of two words is identical, then they are deemed equally likely. The ordered set of candidate words may be truncated to include no more than a maximum number of candidate words, for example three. Equally likely candidate words are preferably treated the in the same manner and may be kept in or truncated from the candidate word set as a group.

Once the candidate word set is refreshed the operation returns to query if the end of the dictionary word list has been reached, step 402. If the dictionary list is at its end, then the parts of speech of the candidate words in the candidate word set are attached to the candidate words, step 416, and the operation of the edit distance match engine is completed, step 418. The candidate word set then is submitted to candidate word set combination buffer 134, shown in FIG. 1.

Figure 5:
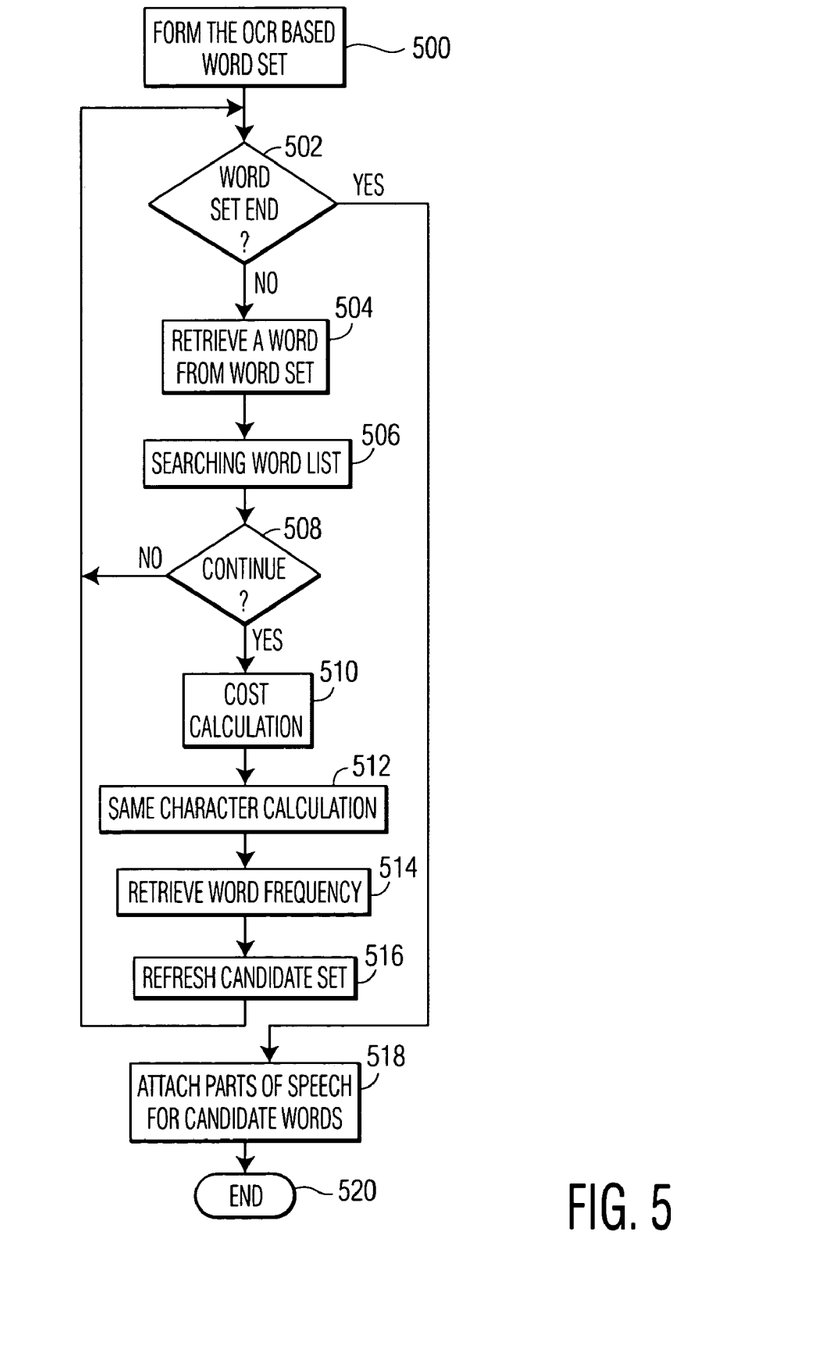
FIG. 5 is a detailed flowchart illustrating an alternate exemplary method of determining candidate words.

An exemplary method of operation of OCR output based match engine 132 is shown in FIG. 5. This match engine considers the characters from all of the dimensions determined by the OCR engine for the selected word together instead of just the first dimension. Take the ground word "this" as an example:

TABLE 8

| Gnd | t | h | i | s |
| Char0 | t | h | i | S |
| Char1 | f | b | 1 | s |
| Char2 | b | k | l | 8 |

Char0, char1 and char2 are the first, second and third dimensions from OCR engine 100, respectively. In this example, there are 81 combinations, such as thiS, this and thi8. These strings are formed by OCR output based match engine 132 as the OCR based word set, step 500. OCR output based match engine 132 then determines if it is at the end of the OCR based word set, step 502. If words remain in the OCR based word set, then the first remaining OCR based word is retrieved from the set, step 504. The dictionary word list is then searched, step 506, and it is determined whether the retrieved OCR based word matches a dictionary word, step 508. If the retrieved OCR based word is not found in the dictionary list, then OCR output based match engine 132 returns to query for remaining words in the OCR based word set.

If the retrieved OCR based word is found in the word list dictionary, then this word may be added to the set of candidate words and the edist of the retrieved OCR based word is then calculated, step 510. For the OCR output based match engine, there is only one transform operation, substitution. Also, no confusion matrix is used. For example, assume that the output data of OCR engine 100 includes three dimensions for a given character (char0, char1 and char2). The substitute costs of substituting the different dimensions for char 0 may be defined by Equation 2, $$subCost(char0, char0)=0$$

$$subCost(char0, char1)=LEVEL1$$

$$subCost(char0, char2)=LEVEL2 \quad \text{Equation 2}$$

LEVEL1 is a positive integer less than 10, e.g. 5. LEVEL2 is larger than LEVEL1 and less than 10, e.g., 6. For example, using the example from Table 8, the edist for the candidate word "this" is:

$$edist(\text{"thiS"}, \text{"this"})=0+0+0+LEVEL1=LEVEL1=7$$
Equation 3

This value of samec of the retrieved OCR based word is calculated, step 512 and the value of fr for the retrieved OCR based word is retrieved, step 514. The set of candidate words is then refreshed to include the retrieved OCR based word, step 516. The values of samec and fr and the comparing method for word1(cost, samec, fr) and word2(cost, samec, fr) are the same as for the edit distance match engine.

Once the candidate word set is refreshed the operation determines if all of the set of OCR based words has reached its end, step 502. If the OCR based word set is at its end, then the parts of speech of the candidate words in the candidate word set are attached to the candidate words, step 518, and the operation of the edit distance match engine is completed, step 520. The candidate word set is then submitted to candidate word set combination buffer, 134 shown in FIG. 1.

Figure 6:
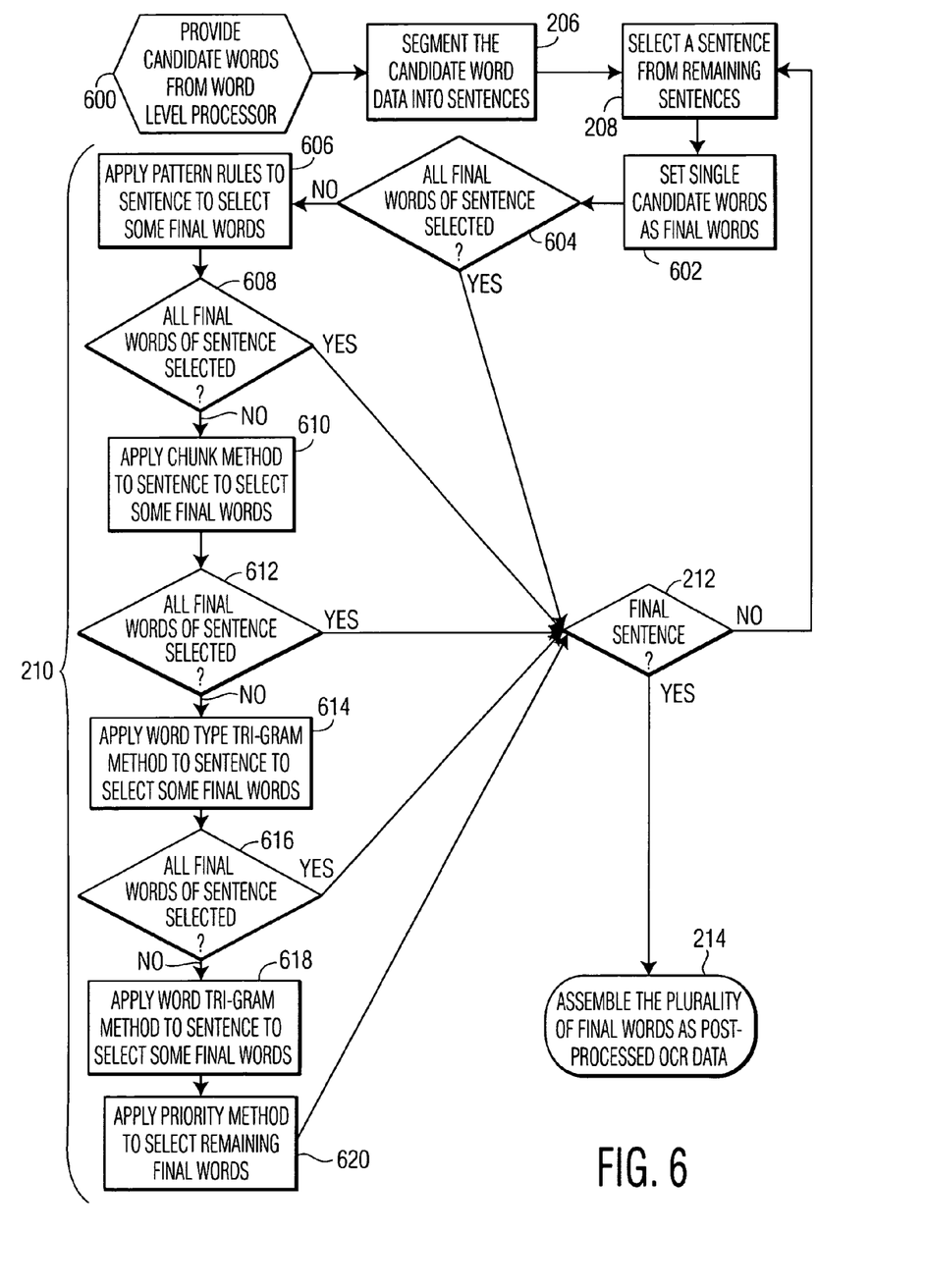
FIG. 6 is a detailed flowchart illustrating an exemplary word disambiguity processing method for post-processing OCR data.

FIG. 6 is a detailed flowchart of an exemplary word disambiguity processing method using word disambiguity processor 112, shown in FIG. 1. This exemplary method may be used as part of the exemplary post processing method described above with regard to FIG. 2 (steps, 206, 208, 210, 212, and 214). The exemplary linguistic methods employed in the exemplary method of FIG. 6 are a pattern rules method, a chunk-based candidate choosing method, a word-type based tri-gram candidate choosing method, and a word based tri-gram candidate choosing method. These methods are desirably used in a specific order. Once the matching final word for an initial word has been determined, it is marked to bypass any additional processing modules. Also, if all words of a sentence are marked as final, then the post-processing of the sentence is completed and the resulting sentence is provided to output device 104.

The sets of candidate words corresponding to the initial words of the OCR output data are provided to word segmentation engine 110, step 600. All candidate word sets formed by word level processor 108 are desirably sorted by transformation cost (edist, samec, and fr). Word segmentation engine 110 segments the candidate words into sentences, step 206, and provides the segmented sentences to sentence selector 136. Sentence selector 136 selects a sentence from remaining sentences, step 208. The number of words in each set of candidate word that make up the selected sentence are counted. The sole candidate word of any initial word with only one candidate word is set as the matching final word and marked as final, step 602. The selected sentence is then checked to see if all of the words are marked as final, step 604.

Whenever all of the words in the selected sentence are marked as final, sentence selector 136 is queried to determine if all of the segmented sentences have been processed by word disambiguity processor 112, step 212. If un-processed sentences remain then sentence selector 136 selects another sentence, step 208. Once all of the sentences have been word disambiguity processed, the plurality of final words from all of the sentences are assembled and provided to output device 104, step 214.

Selected sentences which include initial words that have not been finalized are sent on to pattern rule processor 138 for further word disambiguity processing. Pattern rule processor 138 applies pattern rules to the words of the selected sentence, step 606, in an attempt to select more final words for the selected sentence.

The word list dictionary generally does not cover all the words that may appear in an original document, such as proper names. For example, the phrase "Dr. Aharonov" includes two words. While it is likely that "Dr." may be found in an exemplary dictionary word list, it is unlikely that "Aharonov" is in the list. It is noted that "Dr." is commonly used as a title in personal names and it may be assumed that the succeeding word "Aharonov" is likely to be a personal name. The use of pattern rules may help with processing such words. Personal names may be processed by a "title pattern rule." Using this rule, a "title word list", including words such as "Dr.," "Mr.," "Ms., etc., may be formed and all of the words of the selected sentence compared to list. If a word is found in the title word list, then the first candidate word of the succeeding word (a set number of succeeding words) is selected as the matching final word of the succeeding word and that word is marked as final (e.g., in the previous example, "Aharonov" would be the word finalized). This is an example of a "forward pattern rule" in which the word following a "forward patterned initial word" (an initial word identified by the pattern) is affected. "Backward pattern rules" may also be used to identify proper names preceding "backward pattern words," such as "Co.," "Inc.," "Jr.," "Sr.," etc.

After applying the pattern rules, the selected sentence is again checked to see if all of the words are marked as final, step 608. Selected sentences which include initial words that have not been finalized are sent on to chunk method processor 140 for further word disambiguity processing. Chunk method processor 140 processes the words of the selected sentence, step 610, in an attempt to select more final words for the selected sentence.

As a linguistic concept "chunks" are structures of word clustering that emerge from a variety of types of experimental data, such as pause durations in reading, and naive sentence diagramming. Some have assumed that a chunk has syntactic structure, as a grammatical component of a parsing tree. In the present exemplary embodiment a chunk is an n-word combination that has a high occurrence frequency. The number of words in the chunk, n, may vary, but must be at least two, with three being a typical number.

Each group of n consecutive initial words in the selected sentence may be processed in turn by chunk method processor 140. For each of these groups, a set of candidate chunks is formed. The set of candidate chunks includes every combination of the candidate words corresponding to the initial words of the group. The set of candidate chunks is then compared to a chunk base to determine if any of the candidate chunks is contained in the chunk base.

The chunk base may be obtained from corpora, such as BNC and TREEBANK, that may have been used to augment the dictionary word list. A chunk is a three word high frequency phrase. The frequency of every n consecutive word group of the corpora is calculated; groups with a high frequency of occurrence (such as more than 3) are determined to be chunks and are added into the chunk base.

For example "a lot of" is a three word chunk. If the OCR engine recognized "a lot of" as "a 1at of", match engine level 120 may produce a candidate word set of "let", "lot" and "fat" corresponding to "1at." The context of "1at" is "a" and "of". There are three possible candidate chunks that may be formed from these candidate words, "a let of", "a lot of" and "a fat of". Scanning the chunk bank finds one of these three candidate chunks is in the chunk base, "a lot of" in this example.

Once all the candidate chunks of the selected sentence has been checked one by one, the results may be compiled. If any chunk has been found that contains an initial word that is not yet finalized, the candidate word set corresponding to that initial word is examined. Candidate words that did not appear in any chunk are removed from the candidate word set. If only one candidate word remains after this operation then the remaining candidate word becomes the final word and the word is marked as final. In the previous example, "lot" would be selected as the final word for "1at."

After applying the chunk method, the selected sentence is again checked to see if all of the words are marked as final, step 612. Selected sentences which include initial words that have not been finalized are sent on to word-type tri-gram processor 142 for further word disambiguity processing. Word-type tri-gram processor 142 applies a word-type tri-gram processing method to the words of the selected sentence, step 614, in an attempt to select more final words for the selected sentence.

Stochastic n-gram models, such as the exemplary word-type tri-gram processing method, may provide a powerful and flexible method to parse text. In these models, the context of a word is the entire sentence. The exemplary word-type tri-gram processing method is described below using tn-grams of the word parts of speech (POS's). It may be understood by one skilled in the art that word-type properties other than word POS's and n-grams of a different size could be alternatively used in this method.

A set of candidate sentence diagrams is formed for the selected sentence. First a set of candidate sentences, including every combination of the candidate words corresponding to the initial words of the selected sentence, is formed. Each of the candidate words has at least one part of speech associated with it. Using these associated parts of speech, the set of candidate sentence diagrams is formed, with at least one candidate sentence diagram associated with each candidate sentence.

Once the set of candidate sentence diagrams has been formed, the POS tri-gram cost of each candidate sentence is calculated. This may be done by determining the POS tri-gram cost of each candidate sentence diagram and adding the POS tri-gram costs of candidate sentence diagrams associated with a given candidate sentence together. Equation 4 illustrates an exemplary method of calculating the POS tri-gram cost, Tri-Cost(pathi), of a candidate sentence diagram labeled "pathi" with n words:

$$\text{Tri-Cost(pathi)} = T(pos1, pos2, pos3) * T(pos2, pos3, pos4) * T(pos3, pos4, pos5) \ldots * T(posn-2, posn-1, posn) \quad \text{Equation 4}$$

$T(pos1, pos2, pos3)$ is the tri-gram value of POS tri-gram $(pos1, pos2, pos3)$, representing the respective parts of speech of three consecutive words in a sentence. All possible POS tri-grams are desirably retrieved from a large sample corpus and all the corresponding $T(pos1, pos2, pos3)$ desirably stored in a POS tri-gram database. The POS trigram database is formed by determining the occurrence frequency of the POS tri-gram in the sample corpus.

Assuming that "a, b, c" is a tri-gram of the POS's of three consecutive words, $N(a, b, c)$ is the occurrence frequency of POS tri-gram "a, b, c," $N(a, b)$ is the occurrence frequency of a POS tri-gram including "a, b," and $N(a, c)$ is the occurrence frequency of a POS tri-gram including "a, c". For example, if there are two POS tri-gram "a, b, c" and "a, d, c" in a large corpus, then $N(a, c)$ is 2. $N(a)$ is the occurrence frequency of a POS tri-gram including "a". $N(*)$ is the word count of the corpus (corpus size). The probability, which may be used as the POS value, $T(a, b, c)$, of a given POS tri-gram may be calculated from these occurrence frequencies. $T(a, b, c)$ is a floating value range from 0 to 1. It may be desirable to add one occurrence of each tri-gram to the sample corpora in order to provide a minimum value for each $T(a, b, c)$ other than 0.

In an exemplary embodiment using a sample corpus formed from public domain English language corpora, such as BNC-world and TREEBANK, each of which contains indications of parts of speech, a set of 41 POS's are determined and used as the bases of the word-type tri-gram database.

Although this method described above relates to the formation of a word-type tri-gram database, it is noted that a word tri-gram database may be formed using similar methods. The only difference is that the instead of counting the occurrence frequency of POS's of the words in the sample corpus, the occurrence frequency of the words themselves are are counted.

After the POS tri-gram cost of each candidate sentence is calculated, the candidate sentence having the highest POS tri-gram cost is selected as the final sentence and all of the candidate words forming the final sentence are chosen as the final words of their matching initial words. If more than one candidate sentence has the same POS tri-gram cost, then no final sentence is selected, but the candidate word sets are examined and any candidate words that do not appear in at least one of the candidate sentences having the highest POS trigram cost are removed. If only one candidate word remains in the candidate word set corresponding to an initial word after this operation, then that remaining candidate word becomes the matching final word for that initial word and the word is marked as final.

After applying the word-type tri-gram processing method, the selected sentence is again checked to see if all of the words are marked as final, step 616. Selected sentences which include initial words that have not been finalized are sent on to word trigram processor 144 for further word disambiguity processing. Word tri-gram processor 144 applies a word tri-gram processing method to the words of the selected sentence, step 618, in an attempt to select more final words for the selected sentence.

This method is very similar to the word-type tri-gram processing method described above. The main difference is that the tri-grams being analyzed are word tri-grams of the candidate words from the candidate sentences. The candidate sentences are formed in the same way as in the word-type tri-gram processing method. The word tri-gram costs of each word tri-gram may be found by consulting a pregenerated word tri-gram database. The word tri-gram cost of each sentence is the product of the tri-gram cost of each tri-gram within the candidate sentence.

After the word tri-gram cost of each candidate sentence is calculated, the candidate sentence having the highest word tri-gram cost is selected as the final sentence and all of the candidate words forming the final sentence are chosen as the final words of their matching initial words. If more than one candidate sentence has the same word tri-gram cost, then no final sentence is selected, but the candidate word sets are examined and any candidate words that do not appear in at least one of the candidate sentences having the highest word tri-gram cost are removed. If only one candidate word remains in the candidate word set corresponding to an initial word after this operation, then that remaining candidate word becomes the matching final word for that initial word and the word is marked as final.

The selected sentence is then sent on to priority based method processor 146 to complete the word disambiguity processing of the selected sentence. Priority based method processor 146 determines any remaining final words by selecting the first candidate word of the candidate word set corresponding to the initial word as the matching final word, step 620. Sentence selector 110 is then queried to determine if any sentences remain to be word disambiguity processed.

While the invention has been described with respect to particular embodiments, those of ordinary skill in the art may appreciate variations in the structure and steps that are within the scope and spirit of the invention.

What is claimed:

1. A post-processor for character data of an optical character recognition (OCR) engine comprising:
   a word segmentation engine coupled to the OCR engine to segment the character data into a plurality of initial words;
   a word level processor coupled to the word segmentation engine to process the plurality of initial words and determine a set of candidate words corresponding to each initial word;

a sentence segmentation engine coupled to the word level processor to segment the plurality of initial words into at least one sentence; and a word disambiguity processor coupled to the sentence segmentation engine to determine a final word from each set of candidate words;

wherein the word disambiguity processor processes each sentence of the at least one sentence separately.

2. The post-processor of claim 1, wherein the word level processor includes:

a word selector coupled to the word segmentation engine to select initial words for processing;

a word arbitrator coupled to the word selector to compare the selected initial words to a dictionary word list and to determine a set of candidate words for each selected initial word found in the dictionary word list;

an error type arbitrator coupled to the word checking and unknown word arbitrator to determine an error type of each selected initial word not found in the dictionary word list; and at least one match engine coupled to the error type arbitrator to determine a set of candidate words for the selected initial words not found in the dictionary word list;

wherein one match engine of at least one match engine is chosen to process a selected initial word based on the error type of the selected initial word determined by the error type arbitrator.

3. The post-processor of claim 2, wherein the at least one match engine includes at least one of:

a capital word error match engine;
a digital word error match engine;
a word segmentation error match engine;
a pattern transformation match engine;
an edit distance match engine; and
an OCR output based match engine.

4. The post-processor of claim 1, wherein the word disambiguity processor includes:

a sentence selector coupled to the sentence segmentation engine to select the one sentence of the at least one sentence at a time for processing; and at least one linguistic method processor coupled to the sentence selector to determine the final word from each set of candidate words of the selected sentence.

5. The post-processor of claim 4, wherein the at least one linguistic method processor includes at least one of:

a pattern rule processor;
a chunk method processor;
a word-type tri-gram processor;
a word tri-gram processor; and
a priority based method processor.

6. A method of post-processing character data from an optical character recognition (OCR) engine, comprising the steps of:

a) segmenting the character data into a set of initial words;
b) word level processing the set of initial words and determining at least one candidate word corresponding to each initial word;
c) segmenting the set of initial words into a set of sentences, each sentence in the set of sentences including a plurality of initial words and candidate words corresponding to the initial words;
d) selecting, from the set of sentences, a sentence;
e) word disambiguity processing the sentence selected in step (d) to determine a plurality of final words, wherein a final word is selected from the at least one candidate word corresponding to a matching initial word; and f) assembling the plurality of final words as post-processed OCR data.

7. The method of claim 6, wherein step (b) further includes the steps of:

b1) selecting one initial word;
b2) comparing the selected initial word to a set of dictionary words;
b3) determining the at least one candidate word corresponding to the selected initial word to be the selected initial word when the selected initial word matches a dictionary word;
b4) determining an error type, from a set of error types, corresponding to the selected initial word when the selected initial word does not match a dictionary word; and
b5) determining the at least one candidate word corresponding to the selected initial word based on the error type determined in step (b4) and the set of dictionary words when the selected initial word does not match a dictionary word.

8. The method of claim 7, wherein:

the set of error types include capitalization error, digital error, word segmentation error, pattern error, common word error; and step (b5) includes the steps of;

correcting capitalization errors of the selected initial word and determining the corrected word to be the at least one candidate word corresponding to the selected initial word when the error type determined in step (b4) is a capitalization error;

correcting digital errors of the selected initial word and determining the corrected word to be the at least one candidate word corresponding to the selected initial word when the error type determined in step (b4) is a digital error;

correcting word segmentation errors of the selected initial word and determining the corrected word to be the at least one candidate word corresponding to the selected initial word when the error type determined in step (b4) is a word segmentation error;

transforming the selected initial word based on predetermined transformation patterns of the OCR engine and determining the transformed word to be the at least one candidate word corresponding to the selected initial word when the error type determined in step (b4) is a pattern error;

transforming at least one character datum of the selected initial word to determine the at least one candidate word corresponding to the selected initial word, calculating an transformation cost based on the at least one character datum transformation for each determined candidate word, and ordering the determined candidate words in ascending calculated transformation cost order when the error type determined in step (b4) is a common word error.

9. The method of claim 8, wherein the transformation cost of a candidate word includes:

edit distance to transform the at least one character datum;
number of same character data in the selected initial word and candidate word; and
a predetermined frequency of the candidate word.

10. A computer readable medium adapted to instruct a general purpose computer to post-process character data from an optical character recognition (OCR) engine, the method comprising the steps of:

a) segmenting the character data into a set of initial words;
b) word level processing the set of initial words and determining at least one candidate word corresponding to each initial word;
c) segmenting the set of initial words into a set of sentences, each sentence including a plurality of initial words and candidate words corresponding to the initial words;
d) selecting, from the set of sentences, a sentence;
e) word disambiguity processing the sentence selected in step (d) to determine a plurality of final words, wherein a final word is selected from the at least one candidate word corresponding to a matching initial word; and
f) assembling the plurality of final words as post-processed OCR data.

11. The computer readable medium of claim 10, wherein step (e) of the method includes the step of:
    e1) determining a final word to be the at least one candidate word corresponding to a matching initial word when there is exactly one corresponding candidate word.

12. The computer readable medium of claim 11, wherein step (e) of the method further includes the steps of:
    e2) skipping to step (f) if each initial word of the plurality of initial words of the selected sentence has a matching final word;
    e3) comparing selected candidate words to a set of forward pattern words;
    e4) determining a first candidate word of the at least one candidate word corresponding to a forward patterned initial word to be the matching final word of the forward patterned initial word, the forward patterned initial word being directly following an initial word of the selected sentence matching one of the set of forward pattern words;
    e5) comparing selected candidate words to a set of backward pattern words; and
    e6) determining a first candidate word of the at least one candidate word corresponding to a backward patterned initial word to be the matching final word of the backward patterned initial word, the backward patterned initial word being directly before an initial word of the selected sentence matching one of the set of backward pattern words.

13. The computer readable medium of claim 12, wherein:
    the at least one candidate word corresponding to each initial word determined in step (b) of the method are ordered; and
    step (e) of the method further includes the steps of;
        e7) skipping to step (f) if each initial word of the plurality of initial words of the selected sentence has a matching final word;
        e8) determining the matching final word to be the first candidate word corresponding to each initial word of the sentence for which a matching final word is not determined.

14. The computer readable medium of claim 11, wherein step (e) of the method further includes the steps of:
    e2) skipping to step (f) if each initial word of the plurality of initial words of the selected sentence has a matching final word;
    e3) selecting a chunk of initial words of the selected sentence, the chunk including;
        a predetermined number of consecutive initial words, at least one of the included initial words not having a matching final word;
        the final word matching an initial word of the chunk when the final word is determined; and
        the at least one candidate word corresponding to an initial word of the chunk when a matching final word is not determined;
    e4) creating a set of candidate chunks from combinations of the matching final words and corresponding candidate words included in the selected chunk;
    e5) comparing each candidate chunk to a set of predetermined chunks; and
    e6) choosing a candidate chunk matching one chunk of the set of predetermined chunks as a final chunk;
    e7) determining each final word matching each initial word of the selected chunk to be the corresponding word of the final chunk when there is exactly one final chunk;
    e8) repeating (e3), (e4), (e5), (e6), and (e7) until all chunks of the sentence are selected.

15. The computer readable medium of claim 14, wherein:
    the at least one candidate word corresponding to each initial word determined in step (b) of the method are ordered; and
    step (e) of the method further includes the steps of;
        e9) skipping to step (f) if each initial word of the plurality of initial words of the selected sentence has a matching final word;
        e10) determining the matching final word to be the first candidate word corresponding to each initial word of the sentence for which a matching final word is not determined.

16. The computer readable medium of claim 11, wherein step (e) of the method further includes the steps of:
    e2) skipping to step (f) if each initial word of the plurality of initial words of the selected sentence has a matching final word;
    e3) determining a part of speech (POS) for each determined final word of the sentence;
    e4) determining a POS for each candidate word of each initial word of the sentence for which a matching final word is not determined;
    e5) creating a set of candidate sentence diagrams from combinations of the determined POS's corresponding to each initial word of the selected sentence;
    e6) creating a complete set of POS N-grams of the determined POS's for each candidate sentence diagram;
    e7) providing a POS occurrence rate for each POS N-gram;
    e8) calculating a POS cost for each candidate sentence diagram, the POS cost of a candidate sentence diagram equaling the product of POS occurrence rates of each POS N-gram of the complete set of POS N-grams of the candidate sentence diagram;
    e9) selecting a final sentence diagram having a highest POS cost when one candidate sentence diagram has a POS cost higher than the other candidate sentence diagrams; and
    e10) creating a final sentence by replacing each POS in the final sentence diagram with the word from which the POS was determined when one candidate sentence diagram has a POS cost higher than the other candidate sentence diagrams;
    e11) determining each final word of the sentence to be the word of the final sentence matching each initial word when one candidate sentence diagram has a POS cost higher than the other candidate sentence diagrams.

17. The computer readable medium of claim 16, wherein:
the at least one candidate word corresponding to each initial word determined in step (b) of the method are ordered; and
step (e) of the method further includes the steps of;
  e12) skipping to step (f) if each initial word of the plurality of initial words of the selected sentence has a matching final word;
  e13) determining the matching final word to be the first candidate word corresponding to each initial word of the sentence for which a matching final word is not determined.

18. The computer readable medium of claim 16, wherein N equals three.

19. The computer readable medium of claim 11, wherein step (e) of the method further includes the steps of:
  e2) skipping to step (f) if each initial word of the plurality of initial words of the selected sentence has a matching final word;
  e3) creating a set of candidate sentences from combinations of the determined final words of the selected sentence and the at least one candidate word corresponding to each initial word of the selected sentence not having the matching final word;
  e4) creating a complete set of word N-grams for each candidate sentence;
  e5) providing a word occurrence rate for each word N-gram;
  e6) calculating a word cost for each candidate sentence, the word cost of a candidate sentence equaling the product of word occurrence rates of each word N-gram of the complete set of word N-grams of the candidate sentence;
  e7) selecting a final sentence having a highest word cost when at least one candidate sentence has a word cost higher than other ones of the candidate sentences; and
  e8) determining each final word of the sentence to be the word of the final sentence matching each initial word when one candidate sentence has a word cost higher than the other candidate sentences.

20. The computer readable medium of claim 19, wherein:
the at least one candidate word corresponding to each initial word determined in step (b) of the method are ordered; and
step (e) of the method further includes the steps of;
  e9) skipping to step (f) if each initial word of the plurality of initial words of the selected sentence has a matching final word;
  e10) determining the matching final word to be the first candidate word corresponding to each initial word of the sentence for which a matching final word is not determined.

21. The computer readable medium of claim 19, wherein N equals three.

* * * * *